Figure 1:
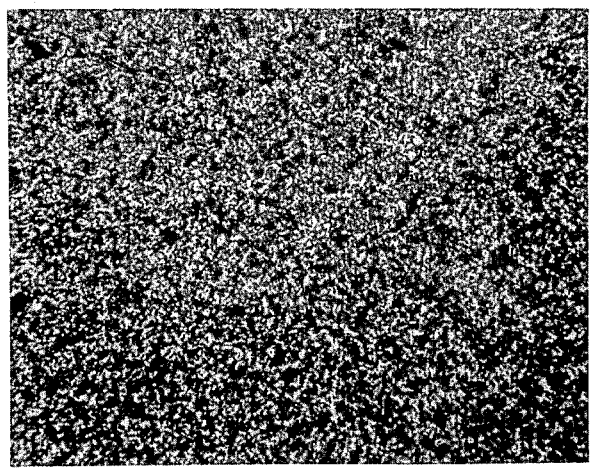

United States Patent [19]

Lee et al.

[11] 4,407,968

[45] Oct. 4, 1983

[54] CERAMIC AL$_2$O$_3$ SUBSTOICHIOMETRIC TIC BODY

[75] Inventors: Minyoung Lee, Schenectady; Lawrence E. Szala, Scotia, both of N.Y.

[73] Assignee: General Electric Company, Schenectady, N.Y.

[21] Appl. No.: 412,336

[22] Filed: Aug. 27, 1982

Related U.S. Application Data

[62] Division of Ser. No. 332,903, Dec. 21, 1981.

[51] Int. Cl.$^3$ .................... C04B 35/10; C04B 35/56
[52] U.S. Cl. ........................................... 501/87; 51/309
[58] Field of Search ............................. 501/87; 51/309

[56] References Cited

U.S. PATENT DOCUMENTS

| | | | |
|---|---|---|---|
| 2,849,305 | 8/1958 | Frost | 501/87 |
| 3,886,254 | 5/1975 | Tanaka et al. | 501/87 |
| 4,063,908 | 12/1977 | Ogawa et al. | 51/309 |
| 4,320,203 | 3/1982 | Brandt et al. | 51/309 |
| 4,356,272 | 10/1982 | Kanemitsu et al. | 501/87 |

FOREIGN PATENT DOCUMENTS

| | | | |
|---|---|---|---|
| 53-91922 | 8/1978 | Japan | 501/87 |
| 53-91923 | 8/1978 | Japan | 501/87 |

*Primary Examiner*—Mark Bell
*Attorney, Agent, or Firm*—Jane M. Binkowski; James C. Davis, Jr.; James Magee, Jr.

[57] ABSTRACT

A particulate dispersion of Al$_2$O$_3$, elemental non-diamond carbon and a titanium member selected from the group consisting of elemental titanium, TiH$_2$ and mixtures thereof is formed into a compact and sintered producing a ceramic composite having a minimum Rockwell A hardness of about 92 and being comprised of an Al$_2$O$_3$ phase and a substoichiometric titanium carbide phase.

5 Claims, 2 Drawing Figures

CERAMIC AL$_2$O$_3$ SUBSTOICHIOMETRIC TIC BODY

This application is a division, of application Ser. No. 332,903, filed Dec. 21, 1981.

This invention relates to the production of an Al$_2$O$_3$ ceramic composite having a minimum Rockwell A hardness of about 92 by a sintering process.

The oxide-carbide composite cutting tools, particularly the Al$_2$O$_3$-TiC system, are known to be superior in their mechanical and thermal shock resistance than widely used Al$_2$O$_3$-base ceramic cutting tools. However, the only possible way of synthesizing these materials with respectable properties is by hot pressing a specific particulate mixture of Al$_2$O$_3$ and TiC, which is a rather costly process. Usually, the hot pressing is carried out in a graphite die at about 1600° C. to 1800° C. under pressures ranging up to 4000 psi.

If an effective process could be developed to produce a composite from Al$_2$O$_3$ and titanium carbide with a simple pressing and sintering procedure, the production cost could be significantly reduced.

The present invention is directed to the production of a hard composite comprised of Al$_2$O$_3$ phase and a substoichiometric titanium carbide phase by sintering.

Briefly stated, the process of the present invention is directed to producing a sintered body comprised of an Al$_2$O$_3$ phase and a substoichiometric Ti$_1$C$_x$ phase were x ranges from about 0.65 to about 0.95, said Ti$_1$C$_x$ phase ranging from about 20% by weight to about 40% by weight of said sintered body and said Al$_2$O$_3$ phase ranging from about 80% by weight to about 60% by weight of said sintered body, said sintered body having a minimum Rockwell A hardness of about 92, which comprises forming a mixture composed of Al$_2$O$_3$, non-diamond elemental carbon and a titanium member selected from the group consisting of elemental titanium, titanium hydride and mixtures thereof, said titanium member being used in an amount wherein the titanium component is equivalent to from about 6.2 parts by weight to about 4.2 parts by weight of elemental titanium for each part by weight of said carbon, forming said mixture into a compact, sugjecting the compact to a partial vacuum wherein at least at sintering temperature a significant portion of the residual vapor is carbon monoxide, and heating said subjected compact to a sintering temperature ranging from about 1750° C. to about 1850° C. producing said Ti$_1$C$_x$ phase in situ and said sintered body, said TiH$_2$ decomposing completely at a temperature below sintering temperature to produce titanium and hydrogen gas, said mixture containing amounts of said Al$_2$O$_3$, said titanium member and said carbon which produce said sintered body, said partial vacuum sufficiently removing from the environment of said compact any gas generated during said heating which would have a significantly deleterious effect on said compact.

An alternate embodiment of this invention is a process for producing a sintered body composed of Al$_2$O$_3$ phase and substoichiometric Ti$_1$C$_x$ phase where x ranges from about 0.65 to about 0.95, said Ti$_1$C$_x$ phase ranging from about 20% by weight to about 40% by weight of said sintered body and said Al$_2$O$_3$ phase ranging from about 80% by weight to about 60% by weight of said sintered body, said sintered body having a minimum Rockwell A hardness of about 93, which comprises forming a mixture composed of Al$_2$O$_3$, non-diamond elemental carbon and a titanium member selected from the group consisting of elemental titanium, titanium hydride and mixtures thereof, said titanium member being used in an amount wherein the titanium component is equivalent to from about 6.2 parts by weight to about 4.2 parts by weight of elemental titanium for each part by weight of said carbon, forming said mixture into a compact, subjecting the compact to a partial vacuum wherein at least at sintering temperature a significant portion of the residual vapor is carbon monoxide, heating said subjected compact to a sintering temperature ranging from about 1750° C. to about 1850° C. producing said Ti$_1$C$_x$ phase in situ and a sintered body having an outside surface portion which is impermeable to gas and a minimum Rockwell A hardness of about 91, said TiH$_2$ decomposing completely at a temperature below sintering temperature to produce titanium and hydrogen gas, said mixture containing amounts of said Al$_2$O$_3$, said titanium member and said carbon which produce said sintered body, said partial vacuum sufficiently removing from the environment of said compact any gas generated during said heating which would have a significantly deleterious effect on said compact, and compressing said sintered body in a pressurized gaseous atmosphere under a pressure of at least 5000 psi at a temperature ranging from about 1350° C. to about 1750° C. producing said sintered body having a minimum Rockwell A hardness of about 93, said gaseous atmosphere having no significant deleterious effect on said sintered body.

The product of the present invention is a polycrystalline body comprised of an Al$_2$O$_3$ phase and a substoichiometric Ti$_1$C$_x$ where x ranges from about 0.65 to about 0.95, said Ti$_1$C$_x$ phase ranging from about 20% by weight to about 40% by weight of said body, and said Al$_2$O$_3$ phase ranging from about 80% by weight to about 60% by weight of said body, said body having a minimum Rockwell A hardness of about 92.

Rockwell A hardness as used and determined herein is according to ASTM Designation: E18-74.

Figure 2:
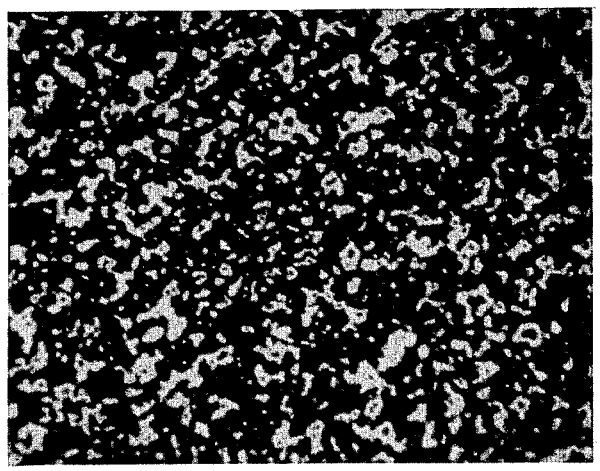

Those skilled in the art will gain a further and better understanding of the present invention from the detailed description set forth below, considered in conjunction with the figures accompanying and forming a part of the specification, in which:

FIG. 1 is a photomicrograph (magnified 200×) showing the polished cross-section of a disk produced in accordance with the present invention, and FIG. 2 is the same as FIG. 1 but it is a photomicrogrph (magnified 690×).

In the present process any polymorphic form of Al$_2$O$_3$, or mixtures thereof, can be used. $\alpha$-Al$_2$O$_3$ is preferred since it gives the lowest shrinkage in sintering and best control of grain growth.

As used herein the term, elemental non-diamond carbon, includes every form of elemental non-diamond carbon and mixtures thereof. Preferably, it is amorphous carbon such as carbon soot, or it is graphite.

In the present process the titanium member is selected from the group consisting of elemental titanium, titanium hydride (TiH$_2$) and mixtures thereof. The titanium member is used in an amount wherein the titanium component is equivalent to from about 6.2 parts by weight to about 4.2 parts by weight of elemental titanium for each part by weight of elemental non-diamond carbon. The titanium member outside this range will not produce the present product. Preferably, the titanium component is equivalent to about 5 parts by weight of elemental titanium for each part by weight of non-diamond elemental carbon. Amounts of the titanium member outside this range are not effective in producing the present sintered body. The TiH$_2$ decomposes completely during the heating step at temperatures below sintering temperature producing titanium and hydrogen gas. Specifically, TiH$_2$ decomposes over a temperature range, but largely at temperatures ranging from about 1100° C. to about 1300° C. The present titanium member provides the titanium for reaction with elemental non-diamond carbon to produce substoichiometric titanium carbide. Specifically, Ti$_1$C$_x$, where x ranges from about 0.65 to about 0.95, is produced in situ during the present heating step.

If desired, a sintering aid additive can be used in the present process. Preferably, the sintering aid additive is selected from the group consisting of TiO$_2$, MgO and mixtures thereof. The amount of sintering aid additive or combination of additives used depends largely on the processing parameters desired. TiO$_2$ in an amount ranging from about 1% by weight to about 7% by weight of the starting mixture is useful to effectively lower sintering temperature. MgO in an amount ranging from about 0.1% by weight to about 1% by weight of the starting mixture is useful for controlling Al$_2$O$_3$ grain growth. Amounts of these additives less than the given minimum amounts are not effective, whereas amounts higher than the given maximum amounts provide no significant advantage.

TiO$_2$ and MgO are likely to introduce oxygen into the lattice of the substoichiometric titanium carbide formed in situ which may be significant, but which, even in maximum amount, would not be measureable quantitatively by X-ray diffraction analysis alone. However, if significant, such oxygen would be measureable quantitatively by standard chemical analysis.

If TiO$_2$ is used in an amount approaching 7% by weight, it is likely to produce a minor phase composed of some oxide of titanium in the product. If MgO is used in an amount approaching 1% by weight, it is likely to produce a minor phase composed of some oxide of magnesium in the product. If a combination of TiO$_2$ approaching 7% by weight and MgO approaching 1% by weight is used, it is likely to produce a minor phase composed of some oxide of titanium and magnesium in the product as well as a minor phase composed of some oxide of titanium, and a minor phase composed of some oxide of magnesium. Generally, the maximum volume fraction of minor phase or phases present in the product is less than about 5% of the total volume of the present product.

In carrying out the present process, a particulate homogeneous or at least a substantially homogeneous mixture or dispersion of Al$_2$O$_3$, titanium member, elemental non-diamond carbon and any sintering aid additive si formed. The components of the mixture or dispersion can be of commercial or technical grade. Specifically, they should not contain any impurities which would have a significantly deleterious effect on the properties of the resulting sintered product, and preferably, the components are at least about 99% pure.

The Al$_2$O$_3$, titanium member, elemental non-diamond carbon and any sintering aid additive can be admixed by a number of techniques such as, for example, ball milling, vibratory milling or jet milling, to produce a significantly or substantially uniform or homogeneous dispersion or mixture. The more uniform the dispersion, the more uniform is the microstructure, and therefore, the properties of the resulting sintered body.

Representative of these mixing techniques is ball milling, preferably with balls of material such as $\alpha$-Al$_2$O$_3$ which has low wear and which has no significant detrimental effect on the properties desired in the final product. If desired, such milling can also be used to break down any agglomerates and reduce all materials to comparable particle sizes. Milling may be carried out dry or with the charge suspended in a liquid medium inert to the ingredients. Typical liquids include ethyl alcohol and carbon tetrachloride. Milling time varies widely and depends largely on the amount and particle size reduction desired and type of milling equipment. In general, milling time ranges from about 1 hour to about 100 hours. Wet milled material can be dried by a number of conventional techniques to remove the liquid medium. Preferably, it is dried by spray drying.

In the present dispersion or mixture the average particle size ranges from about 0.1 micron to about 5 microns. An average particle size less than about 0.1 micron is not useful since it is generally difficult or impractical to compact such a powder to a density sufficient for handling purposes. On the other hand, an average particle size higher than about 5 microns will not produce the present ceramic body. Preferably, the average particle size of the mixture ranges from about 0.3 micron to about 1 micron.

A number of techniques can be used to shape the powder mixture into a compact. For example, it can be extruded, injection molded, die-pressed, isostatically pressed or slip cast to produce the compact of desired shape. Any lubricants, binders or similar materials used in shaping the powder mixture should have no significant deteriorating effect on the resulting sintered body. Such materials are preferably of the type which evaporate on heating at relatively low temperatures, preferably below 500° C., leaving no significant residue. The compact should have a density at least sufficient for handling purposes, and preferably its density is as high as possible to promote densification during sintering.

The compact is placed within a furnace and provided with a partial vacuum wherein the residual vapor has no significantly deleterious effect thereon. Ordinarily, a carbon furnace is used, i.e. a furnace fabricated from elemental non-diamond carbon. This partial vacuum is provided throughout the present heating step producing the present sintered body. Preferably, upon completion of sintering, the sintered body is furnace cooled to room temperature in this partial vacuum. The partial vacuum should be at least sufficient to remove from the furnace chamber, i.e. the environment or atmosphere enveloping the compact, any gas generated during the heating step which would have a significantly deteriorating effect on the compact. On the other hand, the partial vacuum should not be so high as to vaporize the compact to any significant extent. Generally, a partial vacuum ranging from about 1 torr to about 0.01 torr is satisfactory. A significant portion, i.e. higher than about 10% by volume, of the residual vapor in the environment or atmosphere enveloping the compact at sintering temperature is carbon monoxide. Preferably, such carbon monoxide is present during the entire heating period. This carbon monoxide promotes sintering of the compact enabling production of the present product, and without such carbon monoxide, the present sintered body will not be produced. A number of conventional techniques can be used to introduce and maintain the carbon monoxide in the residual vapor. For example, the carbon monoxide can be leaked in using a needle valve, or it can be produced by a carbon heating filament.

The present sintering temperature ranges from about 1750° C. to about 1850° C. Ordinarily, sintering temperatures outside this range will not produce the present sintered body. For best results the sintering temperature ranges from about 1790° C. to about 1810° C.

The particular sintering time period to produce a sintered body having a minimum Rockwell A hardness of 92 or 91 depends largely on the sintering temperature and is determinable empirically with increasing sintering temperature requiring less sintering time. Generally, however, to produce the present sintered body having a minimum Rockwell A hardness of about 92 at a sintering temperature of about 1800° C., a suitable sintering time period is about 2 hours, and to produce the sintered body with a minimum Rockwell A hardness of about 91, the sintering time period at 1800° C. would be somewhat less, i.e. about 1 hour.

Generally, the present sintered body having a minimum Rockwell A hardness of 91 has an outside surface portion which is impermeable to gas. Ordinarily, the outside surface portion of the sintered body with a minimum Rockwell A hardness of 92 is impermeable to gas. One way of determining if the outside surface portion of the sintered body is impermeable to gas can be carried out by suspending the sintered body and immersing it in water or other liquid and determining whether the thus-suspended-immersed body shows any observable weight gain. If no weight gain is observed, then the sintered body will have attained closed porosity in its entire outer surface. Alternatively, the closed porosity can be determined by careful metallographic examination of polished sections of the sintered body.

The Rockwell A hardness of the present sintered body having an outside surface portion which is impermeable to gas, can be increased by subjecting it to hot isostatic pressing. Such hot isostatic pressing can be carried out in a conventional manner. For example, the sintered body can be compressed in a pressurized gaseous atmosphere under a pressure of at least about 5000 psi, generally from about 5000 psi to about 15,000 psi, at a temperature ranging from about 1350° C. to about 1750° C. producing a sintered body having a Rockwell A hardness of about 93 or higher. The gaseous atmosphere should have no significant deleterious effect on the sintered body. Representative of a gas suitable of providing the pressurized gaseous atmosphere is argon, nitrogen and helium.

In the present process, there is no significant loss of $Al_2O_3$, Ti or carbon. What weight loss there is is largely $Al_2O_3$, and it is confined to a thin outside surface portion of the compact so that the bulk of the resulting sintered body does not differ, or does not differ significantly, from the composition of the compact from which it is produced.

The present product is comprised of intermixed phases of $Al_2O_3$ and substoichiometric titanium carbide phases. Specifically, the present product is comprised of a significantly uniform mixture of $Al_2O_3$ phase and substoichiometric titanium carbide phase. The $Al_2O_3$ phase usually has an average grain size ranging from about 1 micron to about 15 microns. The substoichiometric titanium carbide phase ordinarily has an average grain size ranging from about 0.1 micron to about 10 microns.

The $Al_2O_3$ phase in the present product ranges from about 60% by weight to about 80% by weight of the product. The $Al_2O_3$ phase is a continuous phase. It is present as a continuous interconnecting network.

The substoichiometric titanium carbide phase in the present product ranges from about 20% by weight to about 40% by weight of the product. Usually in an amount lower than about 30% by weight, the present substoichiometric $Ti_1C_x$ phase is discontinuous, whereas in an amount higher than about 30% by weight, it is continuous. The present product with a continuous $Ti_1C_x$ phase is electrically conducting. X-ray diffraction analysis of the present product indicates that the lattice parameter of the present substoichiometric titanium carbide phase is slightly smaller than that of stoichiometric titanium carbide.

Ordinarily the volume fraction of pores in the present product is less than about 5% by volume and usually less than 3% by volume of the product. All, or substantially all of the pores are closed or non-interconnecting, and generally, they are less than about 1 micron in diameter. The pores are well distributed in the product and have no significant deleterious effect thereon.

The present invention makes it possible to fabricate complex shaped ceramic articles directly. Specifically, the present product can be produced in the form of a useful simple, complex or hollow shaped article without machining such as an impervious crucible, a thin walled tube, a long rod, a spherical body, or a hollow shaped article. The dimensions of the present product would differ from those of the unsintered body by the extent of shrinkage which occurs during the present process.

The present product is useful as a general wear part such as a nodule or a guide pin. It is particularly useful as a cutting medium. Specifically, the present product is useful as a tool insert which, for example, can be held by a tool shank adapted to be held in a machine tool whereby it can be used for direct machining.

The invention is further illustrated by the following examples where Rockwell A hardness was determined according to ASTM Designation: E 18-74.

EXAMPLE 1

A mixture of 67.7 weight % of $Al_2O_3$ (average particle size 0.3μ), 27.3 weight % of titanium hydride (average particle size less than 2μ), 4.5 weight % of lamp black carbon, and 0.5 weight % of MgO were thoroughly blended by rolling in a plastic container partially filled with ¼ inch diameter high purity alumina (>99%) balls for 24 hours. The amount of titanium hydride was equivalent to about 6.1 parts by weight of elemental titanium for each part by weight of carbon. This insured the production of substoichiometric $Ti_1C_x$ phase were x would be 0.66, since there is no significant loss of Ti or C in the present process.

About 3.9 grams of the resulting blended powder was pressed in a half inch diameter carbide die up to 85 kilo pounds per square inch to form a round disk of about 0.505 inch diameter and 0.485 inch thick.

The pressed disk was placed in a graphite container and then it was packed with alumina powder (5μ to ~10μ). The container was placed in a carbon furnace with a graphite heating element and the furnace was evacuated to $10^{-2}$ torr. The pumping rate was set to maintain a vacuum in the system of $10^{-2}$ torr throughout the run.

The disk was heated up to 1800° C. in about 70 minutes, and then the furnace ranged from 1800° C. to 1820° C. during the next 30 minutes.

The graphite heating element provided carbon monoxide to the compact during the entire heating thereof. Specifically, the graphite element provided carbon monoxide in a significant amount, i.e. an amount sufficient to promote sintering of the compact to produce the present product. The titanium hydride decomposed completely below about 1300° C., largely between 1100° C. and 1300° C., producing titanium in situ and liberating hydrogen gas from the compact. Such hydrogen liberation was noted by the increase in furnace vapor pressure shown on the vacuum pump gauge. Also, as the furnace temperature was raised above approximately 1400° C., the vapor pressure in the furnace rose to about $5 \times 10^{-1}$ torr due to outgassing and gaseous products revolving out of the reaction between the packed powder and the carbonaceous environment in the furnace. The function of the packed powder was to minimize vaporization of $Al_2O_3$ from the compact. The furnace power was then turned off, and the sintered disk was furnace cooled to room temperature within about two hours.

The recovered sintered disk showed about 15.5% shrinkage from the as-pressed dimension and less than 2% weight loss. The sintered disk was electrically conducting which indicated that the titanium carbide phase was continuous.

A polished cross-section of the sintered disk showed fine titanium carbide grains dispersed in an interconnected continuous network of alumina matrix with a small amount, less than about 3% by volume of the disk, of fine scale isolated pores. Only a thin outside scale layer of the sintered disk showed some enrichment of titanium carbide due to loss of alumina through vaporization during sintering. The hardness of the sintered disk was 92 by Rockwell A scale.

Since it is known and has been determined that there is no significant weight loss of titanium, carbon and alumina in the present process, the sintered disk would have to be composed of about 67 weight % $Al_2O_3$ phase and about 31.8 weight % of the $Ti_1C_x$ phase where x is 0.66.

This sintered disk would be useful as a cutting medium or as a wear part.

EXAMPLE 2

The procedure used in this example did not differ significantly from that disclosed in Example 1, except as noted.

A series of experiments were carried out to evaluate the effect of titanium to carbon ratio in the starting mixture on the sintering process and properties of the sintered product. The range of weight ratio between titanium and carbon in the starting mixture was 3.2 to 1 to 7.2 to 1. The combined weight % of titanium and carbon in the starting mixture was maintained at 31.5 for the series, and the balance was 66 weight % alumina, 2 weight % $TiO_2$, and 0.5 weight % MgO. $TiO_2$ and MgO were added to enhance sintering.

Some of the results are summarized in Table I. This series of experiments showed that the best sintering results were accomplished by using a ratio of elemental titanium to carbon of less than stoichiometric composition (stoichiometric composition is 4 to 1), but still higher than minimum ratio to keep in the titanium carbide phase (about 7.5 to 1) as shown in the phase diagram.

TABLE I

| Experiment | Elemental Ti to C Ratio | % Weight Loss | Average % Shrinkage | x for $Ti_1C_x$ Phase | Average Rockwell A Hardness | Remarks |
|---|---|---|---|---|---|---|
| 1 | 3.2:1 | 4.8 | 13.6 | 1.25 | — | porous |
| 2 | 4.7:1 | 1.4 | 15.9 | 0.85 | 91 | |
| 3 | 4.8:1 | 1.8 | 16.8 | 0.83 | 92.9 | |
| 4 | 5.0:1 | 1.9 | 16.9 | 0.8 | 93.2 | |
| 5 | 5.3:1 | 1.2 | 16.7 | 0.75 | 93.2 | |
| 6 | 6.5:1 | 1.3 | 16.8 | 0.62 | — | scattered coarse pores |

In Table I the weight loss was due mostly to loss of $Al_2O_3$.

In Experiment 1 of Table I, where the ratio of elemental Ti to C was 3.2 to 1, the hardness of the sintered body could not be measured because it fractured due to its porosity.

Experiments 2 to 5 of Table I illustrate the present invention. The sintered body of Experiment 2 had a hardness which, if the disk were subjected to hot isostatic pressing, i.e. compressed in a pressurized gas according to the present invention, its Rockwell A hardness would be increased to at least 93.

The sintered bodies of Experiments 3, 4 and 5 would be useful as cutting mediums and as wear parts.

A polished cross section of the sintered body of Experiment 5 is shown in FIGS. 1 and 2. Specifically, FIG. 1 shows the polished surface at a magnification of 200×, whereas FIG. 2 shows the surface of FIG. 1 at a magnification of 690×. In the figures, the darker phase is $Al_2O_3$, and the lighter phase is the substoichiometric titanium carbide phase. FIG. 2 shows that the $Al_2O_3$ phase is interconnecting. Also, in FIG. 2, although the lighter phase, i.e. the titanium carbide phase, does not appear to be interconnecting, it was sufficiently interconnecting to make the sintered body electrically conducting. Both figures illustrate the significantly uniform mixture, i.e. the substantial intermixing, of the $Al_2O_3$ and titanium carbide phases in the product of the present invention. Such intermixing assures significant uniformity of properties. Close examination of the surface illustrated in FIG. 2 showed a few fine isolated pores which were too small to be measured and which probably comprised less than 1% by volume of the sintered body.

The sintered body of Experiment 6 would not have been useful as a cutting medium.

EXAMPLE 3

The procedure used in this example to produce a sintered body did not differ significantly from that disclosed in Example 1, except as noted.

In Table II, the starting composition of each run (tabulated as Tool No.) is given. An experimental cutting tool of ½ inch square by 0.187 inch thick with 1/32 nose radius was made from each sintered body. A 0.005 inch high and 0.0035 inch deep chamber was ground on the cutting edge.

Each cutting tool was evaluated for cast iron milling application using Cincinnati Model 2ML milling machine equipped with Futurmill Model ZN15M-0808 8 inch diameter milling cutter.

The cast iron work piece was cast according to General Motor's Grade GH232M, and the 16 inch by 6 inch by 5 inch block had three equally spaced four inch diameter holes simulating an engine body. The cutting speed was 1425 surface feet per minute, and the depth and the feed were 0.05 inch and 0.0049 inch per revolution each.

Average uniform frank wear land size and the accumulated cutting time are also shown in Table II.

sintered product was evaluated. In these experiments, the amounts of $TiH_2$ (27.3 weight %), amorphous C (4.5 weight %), and MgO (0.5 weight %) were kept constant, while the amount of $TiO_2$ was varied from 1 to 11 weight % with 2 weight % graduate between each experiment, with balance alumina.

It was determined that the sintering temperature producing sintered bodies with an acceptable hardness decreased as the amount of $TiO_2$ additive was increased,

TABLE II

| Tool No. | Starting Composition (weight %) | | | | | Elemental Ti to C Ratio | x for $Ti_1C_x$ Phase | Rockwell A Hardness | Cutting Time (Min) | Avg. Unif. F.W. (inch) | Remarks |
|---|---|---|---|---|---|---|---|---|---|---|---|
| | $Al_2O_3$ | $TiH_2$ | C | $TiO_2$ | MgO | | | | | | |
| 1 | 77.5 | 16.7 | 3.3 | 2.0 | 0.5 | 5.1:1 | 0.78 | 92.8 | 24.7 | 0.009 | |
| 2 | 66 | 26.3 | 5.2 | 2.0 | 0.5 | 5.1:1 | 0.78 | 92.9 | 24.7 | 0.010 | |
| 3 | 66 | 26.5 | 5.0 | 2.0 | 0.5 | 5.3:1 | 0.76 | 92.9 | 24.7 | 0.009 | |
| 4 | 77.5 | 16.7 | 3.3 | 2.0 | 0.5 | 5.1:1 | 0.78 | 92.5 | 23.7 | 0.007 | Edge chipped after 4 passes |
| 5 | 77.5 | 16.7 | 3.3 | 2.0 | 0.5 | 5.1:1 | 0.78 | 93 | 14.8 | 0.008 | Edge chipped after 3 passes |

All of the Tool Nos. of Table II illustrate the present invention. The performance of these tools was comparable with the average performance of commercial ceramic tools of similar grade.

Portions of the sintered products used for Tool Nos. 1 and 5 were isostatically compressed in a nitrogen atmosphere for 30 minutes under 1500 psi at 1700° C. The Rockwell A hardness of both products was increased to 93.5.

EXAMPLE 4

The procedure used in this example did not differ significantly from that disclosed in Example 1, except as noted.

The starting composition of each mixture is given in Table III.

The final crystal structure of each sintered body was determined by X-ray diffraction analysis, and the X-ray data is shown in Table III.

attaining a minimum of about 1725° C. at 7 weight % addition of $TiO_2$. Further increase in $TiO_2$ addition did not significantly influence the sintering temperature and the hardness of the sintered bodies produced with 7, 9, and 11 weight % $TiO_2$ was about same with Rockwell A scale hardness of 93.

What is claimed is:

1. A polycrystalline body consisting essentially of a significantly uniform intermixture of an $Al_2O_3$ phase and a substoichiometric $Ti_1C_x$ phase where x ranges from about 0.65 to about 0.95, said $Ti_1C_x$ phase ranging from about 20% by weight to about 40% by weight of said body, and said $Al_2O_3$ phase ranging from about 80% by weight to about 60% by weight of said body, said body having a minimum Rockwell A hardness of about 92, said $Al_2O_3$ phase being a continuous interconnecting network.

2. A polycrystalline body consisting essentially of a significantly uniform intermixture of an $Al_2O_3$ phase

TABLE III

| Run No. | Starting Composition (weight %) | | | | | Elemental Ti to C Ratio | Rockwell A Hardness | x for $Ti_1C_x$ Phase | Crystalline Phases in Sintered Product |
|---|---|---|---|---|---|---|---|---|---|
| | $Al_2O_3$ | $TiH_2$ | C | $TiO_2$ | MgO | | | | |
| 1 | 77.5 | 16.7 | 3.3 | 2.0 | 0.5 | 5.1:1 | 93 | 0.78 | $Al_2O_3$ and TiC ($a_o$ = 4.319A) |
| 2 | 66.7 | 27.3 | 4.5 | 1.0 | 0.5 | 6.1:1 | 92.5 | 0.66 | $Al_2O_3$ and TiC ($a_o$ = 4.312A) |
| 3 | 56.7 | 27.3 | 4.5 | 11.0 | 0.5 | 6.1:1 | 93 | 0.66 | $Al_2O_3$ and TiC ($a_o$ = 4.310A) |

All three runs of Table III illustrate the present invention. All of the sintered products of all of the runs of Table III would be useful as cutting mediums and as wear parts.

As shown in Table III, the Ti to C in all three runs had an $a_o$ slightly smaller than the $a_o$ value of 4.3285 A for a stoichiometric TiC. It is due in part to the substoichiometry of the titanium carbide as well as the presence of a minor amount of TiO ($a_o$=4.177 A) as solid solution in the substoichiometric titanium carbide lattice.

EXAMPLE 5

The procedure used in this example did not differ significantly from that disclosed in Example 1, except as noted.

In a series of experiments, the effect of $TiO_2$ additive on the sintering temperature and the hardness of the and a substoichiometric $Ti_1C_x$ phase where x ranges from about 0.65 to about 0.95, said $Ti_1C_x$ phase ranging from about 20% by weight to less than about 30% by weight of said body, said body having a minimum Rockwell A hardness of about 92, said $Al_2O_3$ phase being a continuous interconnecting network and said $Ti_1C_x$ phase being discontinuous.

3. A polycrystalline body consisting essentially of a significantly uniform intermixture of an $Al_2O_3$ phase and a substoichiometric $Ti_1C_x$ phase where x ranges from about 0.65 to about 0.95, said $Ti_1C_x$ phase ranging from higher than about 30% by weight to about 40% by weight of said body and being present at least in an amount of sufficient to make said body electrically conducting, said body having a minimum Rockwell A hardness of about 92, said $Al_2O_3$ phase being a continuous interconnecting network.

4. The polycrystalline body of claim 1 wherein said $Al_2O_3$ phase has an average grain size ranging from about 1 micron to about 15 microns and said $Ti_1C_x$ phase has a average grain size ranging from about 0.1 micron to about 10 microns.

5. A cutting medium consisting essentially of a polycrystalline body consisting essentially of significantly uniform intermixed phases of $Al_2O_3$ and substoichiometric $Ti_1C_x$ where x ranges from about 0.65 to about 0.95, said $Ti_1C_x$ phase ranging from about 20% by weight to about 40% by weight of said body, and said $Al_2O_3$ phase ranging from about 80% by weight to about 60% by weight of said body, said body having a minimum Rockwell A hardness of about 92, said $Al_2O_3$ phase being a continuous interconnecting network.

* * * * *